United States Patent [19]

Amstutz

[11] Patent Number: 4,799,352
[45] Date of Patent: Jan. 24, 1989

[54] APPARATUS FOR CONDITIONING CUT HALMS

[75] Inventor: Jean-Pierre Amstutz, Birr, Switzerland

[73] Assignee: Bucher-Guyer AG, Niederwenigen-Zurich, Switzerland

[21] Appl. No.: 640,533

[22] Filed: Aug. 13, 1984

Related U.S. Application Data

[63] Continuation of Ser. No. 585,619, Mar. 6, 1984, abandoned, which is a continuation of Ser. No. 329,695, Dec. 11, 1981, abandoned.

[30] Foreign Application Priority Data

Dec. 22, 1980 [DE] Fed. Rep. of Germany ....... 3048569

[51] Int. Cl.$^4$ ...................... A01D 43/02; A01D 88/00
[52] U.S. Cl. ........................................ 56/364; 56/16.4
[58] Field of Search ................. 56/1, 13.4, 13.6, 13.7, 56/16.4, 294, 503, 504, 364, 400, DIG. 1

[56] References Cited

U.S. PATENT DOCUMENTS

| | | | |
|---|---|---|---|
| 1,343,884 | 6/1920 | Hamilton | 56/130 |
| 2,746,231 | 5/1956 | Ayers | 56/220 |
| 4,035,992 | 7/1977 | Moosbrucker et al. | 56/DIG. 1 |
| 4,233,803 | 11/1980 | Davis et al. | 56/16.4 |
| 4,299,078 | 11/1981 | Werner | 56/16.4 |

FOREIGN PATENT DOCUMENTS 7900863  11/1979  PCT Int'l Appl. .................. 56/16.4

Primary Examiner—Robert Peshock
Attorney, Agent, or Firm—Marmorek, Guttman & Rebenstein

[57] ABSTRACT

In an agricultural machine movable over the ground in a prearranged direction and capable of conditioning stalked goods, including a rotor member defining a periphery and rotatable in use about a main axis substantially parallel to the ground, and a channel forming member adjacent the rotor member and establishing therewith a guide channel for guiding goods therethrough, a brush arrangement is mounted on one of the members operatively conditioning and sweeping the goods through the guide channel, and conveying prongs are connected to the rotor member at selected portions of its periphery.

1 Claim, 4 Drawing Sheets

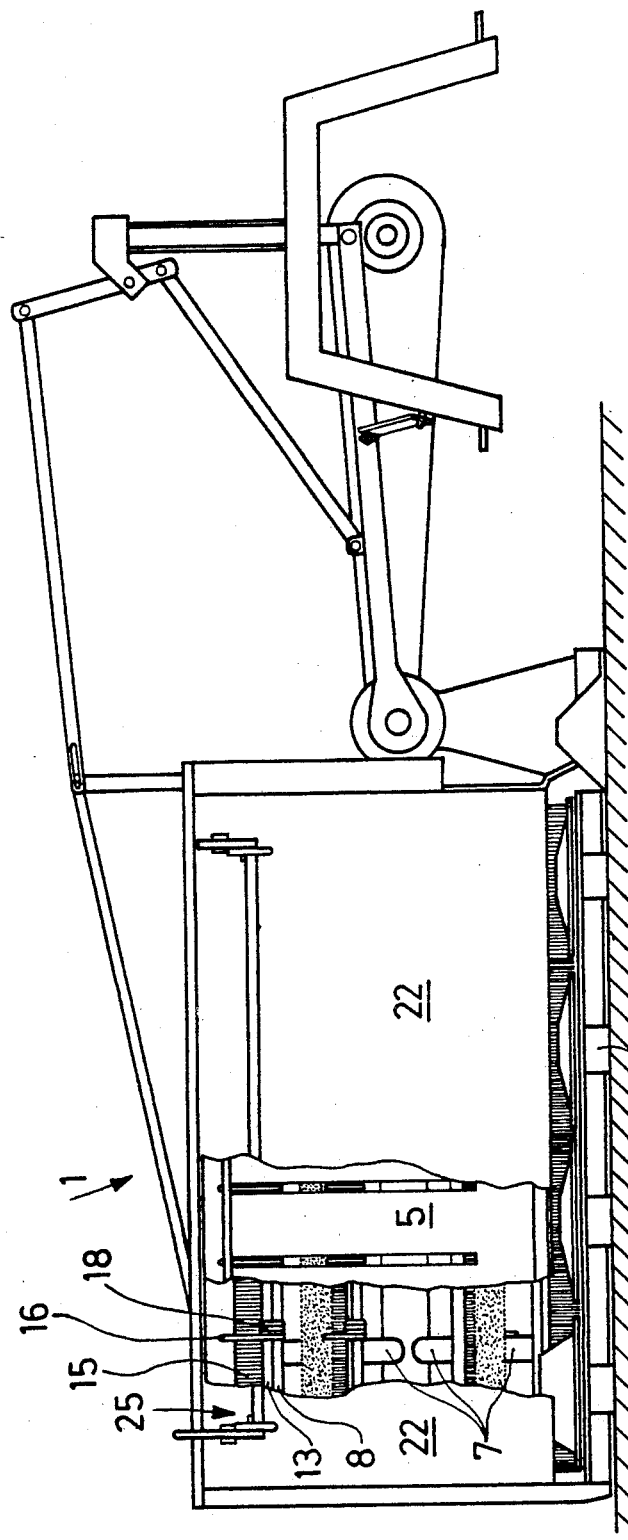

APPARATUS FOR CONDITIONING CUT HALMS

This is a continuation of application Ser. No. 585,619, filed Mar. 6, 1984, abandoned, which is itself a continuation of application Ser. No. 329,695, filed Dec. 11, 1981, abandoned.

BACKGROUND OF THE INVENTION

The invention relates to a machine which may be moved over the ground in a predetermined direction and is capable of conditioning stalked goods taken off the ground. It includes a rotor which defines a periphery and in use is rotatable about a main axis substantially parallel to the ground. A guide member is disposed opposite a portion of the periphery of the rotor and forms therewith a guide channel, and brushes are connected to the rotor at selected portions near the periphery operatively sweeping the goods through the guide channel.

In an apparatus of this type known from International Publication No. WO79/00863, stationary brush elements are mounted within the guide channel so that they are operatively disposed opposite the rotor brushes, to condition the cut goods passing through the guide channel. The depth of insertion of these stationary brush elements into the guide channel is adjustable, so as to tailor the operation of the device to the goods to be processed.

Experience has shown that, as a rotor only equipped with brushes can receive cut stalked goods in general only incompletely, and as furthermore, the goods are subject to strong contamination in the known apparatus, the individual bristles of the brushes must be relatively very stiff, so that the goods on the ground and cut by a mower disposed ahead of the apparatus can be satisfactorily received in the apparatus. It is known that in devices of this type the individual bristles have a diameter of about 4 millimeters.

Here the difficulty is encountered that as a result of the high stiffness of these brushes the cut goods or fodder are torn into shreds or parts in the guide channel, which parts or shreds remain, for example, on the ground during subsequent collection, for example, by a truck, as their size is too small to be seized during pick-up of the goods. Here in particular a fodder rich in leaves, which has a high nutient value, is strongly affected by this destructive process, and subject to large losses.

But as these fine parts must be particularly taken into account, the conditioning effect on the cut stalks or the fodder is no longer present, so that the drying process is considerably delayed. On the other hand, if the apparatus is adjusted so that the tough stalks are considerably abrased, then in turn the nutrient leaves are considerably damaged in an undesired manner.

The known arrangement has a further disadvantage, that no adjustment for different ranges of fodder can take place. Lastly the stationary brush elements extending in an approximately radial direction into the guide channel carry with them the risk of a clogging up of the guide channel. Furthermore the spaces between the brush elements also are clogged up with the cut goods or fodder, so that the conditioning of the fodder passing through the guide channel is further impaired in a disadvantageous manner.

Other arrangements are also known, in which a transport drum or an impact drum includes Y-shaped pivotably connected impact tools. A mower is here disposed immediately ahead of the impact drum, as seen in the direction of movement of the machine, which supplies the cut stalk goods toward the impact drum. Mechanisms of this type subject the stalked goods, however, to strong impacts so that the fodder leaves the machine frequently comminuted or diminished.

A more careful treatment of the stalked goods is obtained with devices which are provided with simple, straight-line or cylindrical mallets. The action of such mallets on the stalked goods is frequently, however, incomplete.

SUMMARY OF THE INVENTION

It is one of the principal objects of the invention to devise an apparatus of the aforedescribed kind, while obviating the previously mentioned disadvantages, which permits a better acceptance of the stalked goods, and additionally a more careful and complete conditioning.

This object is attained by providing conveying prongs mounted near the brushes, which project radially outwardly beyond the periphery of the rotor. Due to this inventive solution it is possible to implement the conveying prongs so that they have a rigidity and shape independent of corresponding properties of the brushes, and suitable for accepting the stalked good in a more desired manner.

This avoids the necessity to take into account any necessary and required properties of the brushes for accepting the stalked goods, so that the bristles of the brushes, as far as their stiffness and shape is concerned, can simply be optimized only with respect to the conditioning of the goods. This solution further permits the stalked goods or fodder to be received in the best possible manner, and to transport the goods through the guide channel, and also to adjust the conditioning within the guide channel as a result of the bristles of the brushes engaging the goods to the desired intensity and uniformity. Furthermore the inventive apparatus is simple in construction.

In a preferred version of the invention the conveying prongs extend with their free ends beyond the free ends of the bristles of the brushes. In this manner the demands required of the machine for accepting the goods, on one hand, and for conditioning of the goods on the other hand, which are frequently divergent, are disengaged from one another, so that a very fine tuning of the conditioning effect, as well as an effective acceptance and processing of the stalked goods is achieved.

Any possible obstacles in the trajectory of the conveying prongs, for example by foreign bodies disposed on the ground, or due to any small irregularities of the ground, and so as to obviate any hard impacts, are avoided in an advantageous version of the invention by the prongs being resiliently mounted for moving about an auxiliary axis parallel to the main axis.

In an advantageous version of the construction of the inventive device the prongs are disposed substantially at equal spacings along the entire width of the rotor. This version ensures a uniform acceptance and transportation of the goods; in a further development the conveying prongs are spaced from another at respective angular spacings along the periphery of the rotor.

In one version of the inventive device, the rotor includes a drum coaxially mounted with the main axis and wherein the prongs and brushes are mounted on the circumference of the drum; in another version of the inventive device a plurality of prongs extend outwardly from the rotor, and a corresponding prong and brush is disposed near the free end of a corresponding arm. In each of the aforesaid versions the inventive measure permits a simple construction of the device.

In a further development of the inventive idea the arms which carry the brushes and conveying prongs are articulated so as to be pivotable about respective supplementary axes parallel to the main axis, the rotor thus being additionally a tool carrier.

This permits, on one hand, that the conveying prongs, on encountering any obstacles, ay avoid such obstacles by a pivotal movement about a corresponding supplemental axis parallel to the main axis, while, on the other hand, an advantageous impact effect or threshing effect can be obtained by the arms on the stalked goods as a result of their pivotable movement.

Where the brush means include a plurality of brushes spaced at respective angular spacings along the periphery of the rotor, at least one conveying prong is advantageously mounted near each brush element. It is particularly advantageous in an implementation of the aforedescribed kind that each brush element is mounted near a pair of conveying prongs. Here it has been shown to be particularly advantageous during acceptance of the goods as well as during the conditioning process, that each conveying prong is mounted near the rear edge of a brush as viewed in the direction of rotation of the rotor. Within the scope of the invention it is further provided that at least the free end portions of the conveying prongs pass through the channel forming means upon rotation of the rotor. As in this version the free end portions of the conveying prongs pass into the channel forming means during rotation of the rotor, the transport action of the conveying prongs is, on one hand, intensified within the guide channel, while, on the other hand, the spacing between the free ends of the bristles of the brushes serving for conditioning of the goods and the channel forming means can be optimally adjusted for each particular use, without taking into account the length of the conveying prongs. This version is implemented in a construction wherein the prongs are arranged along sets of adjacent circles of the periphery, and the channel forming means defines sets of corresponding slits adjacent the channel, so that the free end portions of the prongs of each set pass through respective slits. As a result of the cooperation between the channel forming means and the conveying prongs obtained in the aforementioned implementation, as well as in view of the advantage permitting an advantageous adjustment of the width of the channel forming means, it is particularly advantageous for optimal matching of the machine to the different qualities of the stalked goods or fodder, if the channel forming means are pivotably adjustable to permit movement substantially in a radial direction relative to the free end portions of the conveying prongs by the use of pivoting means, for example in form of a lever mechanism; pivoting of the channel forming means in a radial plane permits adjustment of the width of the guide channel in at least a partial region thereof.

In a still more innovative version of the invention the channel forming means include a conditioning roll positioned adjacent the rotor, and including a plurality of projections extending radially outwardly therefrom and engaging in cooperation with the prongs the goods, so as to enhance the conditioning of the goods during passage through the guide channel. In this version, the guide channel within which conditioning takes place is therefore formed by the space available between the outer periphery of the rotor and the outer circumference of the conditioning roll, where the flow dynamics in this guide channel are permanently influenced not only by the rotor, but also by the conditioning roll. In this version it is advantageous if the conditioning roll is disposed above the rotor. Preferred alternatives in this further development provide for the conditioning roll to be either driven indepedently of the rotor, such as in a direction opposite to the direction of the rotor or at a velocity different from that of the rotor, or where the conditioning roll is freely rotatable. Although these letter versions are somewhat more costly, they nevertheless permit various adjustments independent of the desired conditioning effect.

In a further development of the invention device it is advantageous to employ a mower operatively located in advance of the roll, relative to the direction of movement of the machine, such as a drum-type mower, or a disc-type mower, in which case the rotor is preferably disposed behind a "cutting line" relative to the direction of movement of the machine.

Another version of the machine is finally within the scope of the present invention, which includes a conditioning roll having on its periphery a brush arrangement including bristles projecting radially outwardly, and juxtaposed therewith a supply rotor equipped with conveying prongs mounted at selected parts of the periphery. This version permits uncoupling of the accepting process and the conditioning process which allows optimizing the properties of the conditioning roll and the supply rotor separately by a complete spatial separation between the brush arrangement and the arrangement of the conveying prongs.

Further objects and advantages of the invention will be set forth in part in the following specification, and in part will be obvious therefrom without being specifically referred to, the same being realized and attained as pointed out in the claims hereof.

BRIEF DESCRIPTION OF THE DRAWINGS

For a fuller understanding of the nature and objects of the invention, reference should be had to the following detailed description, taken in connection with the accompanying drawings in which:

FIG. 8 is a side view of the apparatus, according to the present invention, in part section.

DESCRIPTION OF THE PREFERRED EMBODIMENT

Figure 1:
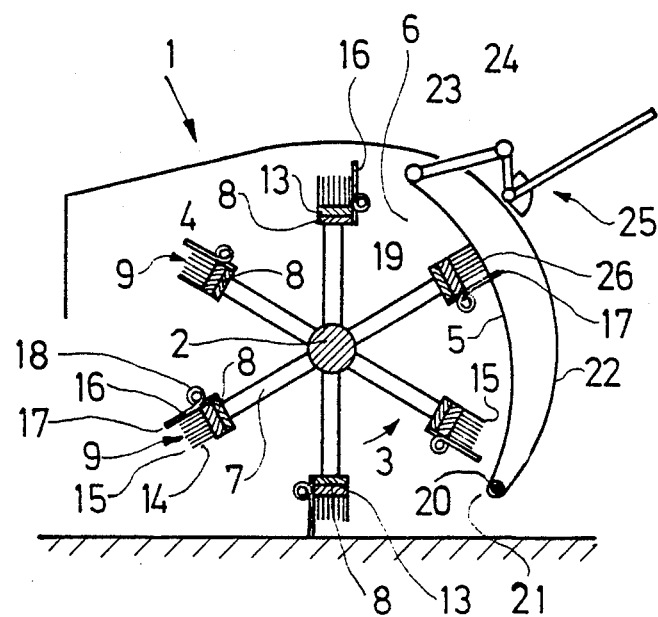
FIG. 1 is an elevation view, in part section, of the apparatus, according to the present invention.

Referring now to the drawings, and in particular to FIGS. 1 through 4 and 6, a machine 1 for conditioning of stalked goods as used primarily in agriculture, includes a rotor 4 rotatable about an axle 2 substantially parallel to the ground in a direction as shown by the arrow 3, which coincides with the direction of motion of the wheel of a device, such as a tractor, driving the machine's rotor. Channel forming means 5 are disposed opposite a portion of the periphery of the rotor 4 and forming therewith a guide channel 6. The rotor 4, whose axle 2 is disposed in a direction at an angle, preferably at right angles, to the direction of movement of the machine and which serves as a tool carrier constituting both an impact-and supply-mechanism, is provided along its width, as can best be seen from FIG. 8, with a plurality of arms 7 extending outwardly from the rotor 4, and provided at their free end portions 8 with brushes 9.

Figure 5:
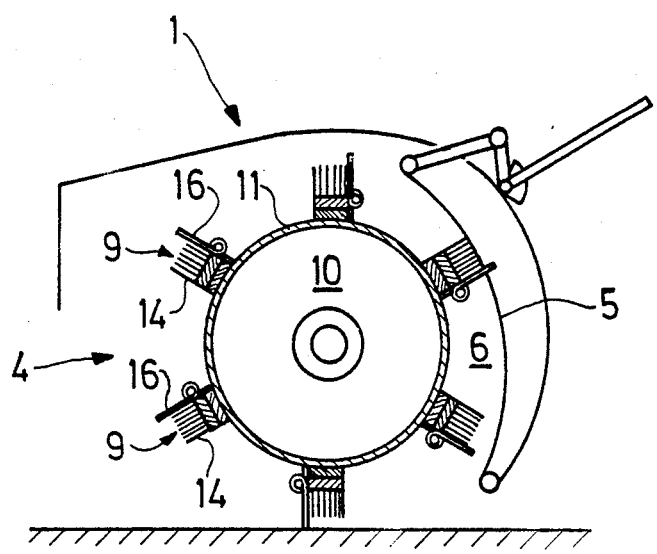
FIG. 5 is an elevation view of still another version of the invention where the rotor is implemented as a drum.

In an alternate version of the invention shown in FIG. 5, there is provided in lieu of the arms 7 a rotor which is implemented as a drum 10, which is coaxially mounted with the axle 2, and which carries on its circumference the brushes 9. The individual brushes 9 are spaced from one another at respective substantially equal angular spacings, and also at substantially equal distances along the width of the drum 10. Instead of providing a plurality of individual brushes 9, the brushes or brush elements mounted on the periphery of the drum 10 may be implemented in the form of an endless brush with its bristles projecting radially outwardly.

So that the individual brush elements 9, or the respective brush elements mounted along the entire width of the rotor can effectively operate, in one version of the invention the outer arms 7 are connected at their free ends 8 by a rod member 13, the brushes 9 being secured to the rod member 13.

Each brush or brush element 9 includes a plurality of elastic bristles 14. The bristles 14 are secured with one of their ends to the periphery of the rotor 4, and project radially outwardly, their free ends 15 defining a trajectory during rotation of the rotor 4, having a radius exceeding that of the rotor 4.

As can be seen in particular from FIGS. 1 through 6, conveying prongs 16 are mounted near respective brushes 9 connected to the periphery of the rotor 4. The conveying prongs 16, which are mounted on the periphery of the rotor 4 and extend radially outwardly therefrom, project with their free ends 16 beyond the free ends 15 of the bristles 14. As a result of an end of each conveying prong 16 opposite its free end 17 being formed in the shape of a loop 18, each conveying prong 16 is resiliently mounted for moving about an auxiliary axis parallel to the main axis. Here it is advantageous for an improved acceptance of the cut stalked goods, if the operative trajectory of the free ends 17 of the conveying prongs 16 rotating with the rotor 4 has a diameter substantially larger than the diameter of the corresponding operative trajectory of the bristles 14.

The conveying prongs 16 may be mounted at regular respective distances from one another extending over the entire width of the rotor 4, or may be provided in pair-like arrangements, so that each brush 9 is mounted along a pair of conveying prongs 16. It can be further seen from the drawings, particularly FIGS. 1 through 6, that each brush has a trailing edge 19 relative to the direction of rotation of the rotor 4, there being mounted near thereto at least one prong 16 located near the rear edge 19.

The channel forming, or guide means 5 are pivotably adjustable for movement substantially in a radial direction relative to the free end portions 17 of the conveying prongs 16. For this purpose the channel forming means 5, which are implemented by a bent metal sheet, includes pivoting means, the channel forming means 5 being pivotable about the pivoting means near its free end 20 disposed at the entry 21 of the guide channel 6; the pivoting means are mounted near the free end of a hood 22 covering the rotor 4. At an end 23 of the channel forming means 5 opposite to its end 22 an actuating rod 24 of a lever mechanism 25 is connected to the channel forming means 5, so that the channel forming means 5, which extends within the hood 22, and which in its curved form closing parallels the operative trajectory of the brush elements 9, may be adjusted and secured at various spacings from the periphery of the rotor or toolcarrier 4.

From the drawings, particularly FIGS. 1 through 6, and 8, it will be seen that sets of prongs 16 are arranged along sets of adjacent circles of the periphery of the rotor 4 and that the channel forming means 5 has a plurality of slits 26 permitting the free end portions 17 of the prodding prongs 16 to pass through the slits 26, without impairing the rotary movement of the rotor 4. This permits the channel forming means 5 to be adjusted in a radially inward direction until it almost abuts the free ends 15 of the bristle 14, due to the free ends 17 of the conveying prongs 16 passing through the slits 26.

Figure 2:
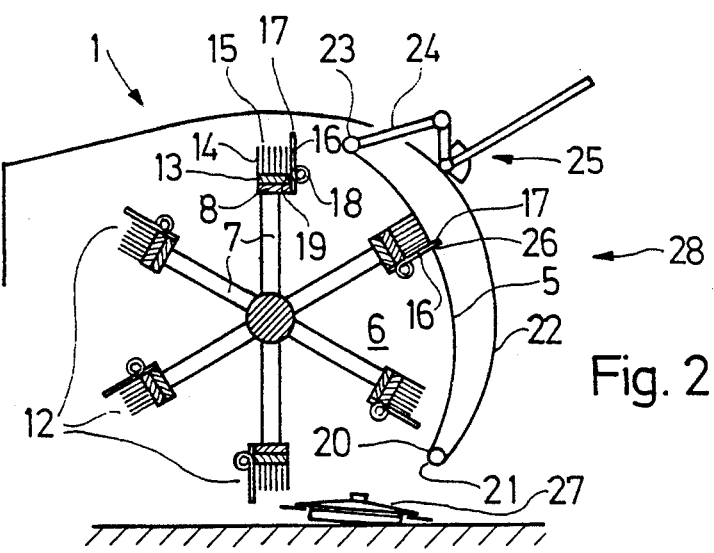
FIG. 2 is an elevation view, in part section, corresponding to FIG. 1, used in conjunction with a disc mower.

As can be seen in the version shown in FIG. 2, a disc mower 27 is operatively located ahead of the rotor 4, relative to the direction of movement of the machine, and wherein the mower operatively defines a "cutting line" for the stalked goods, the rotor 4 being disposed behind the cutting line relative to the direction of movement of the machine. The machine, according to the present invention together with the disc mower 27 forms jointly a mower conditioning machine 28.

Figure 3:
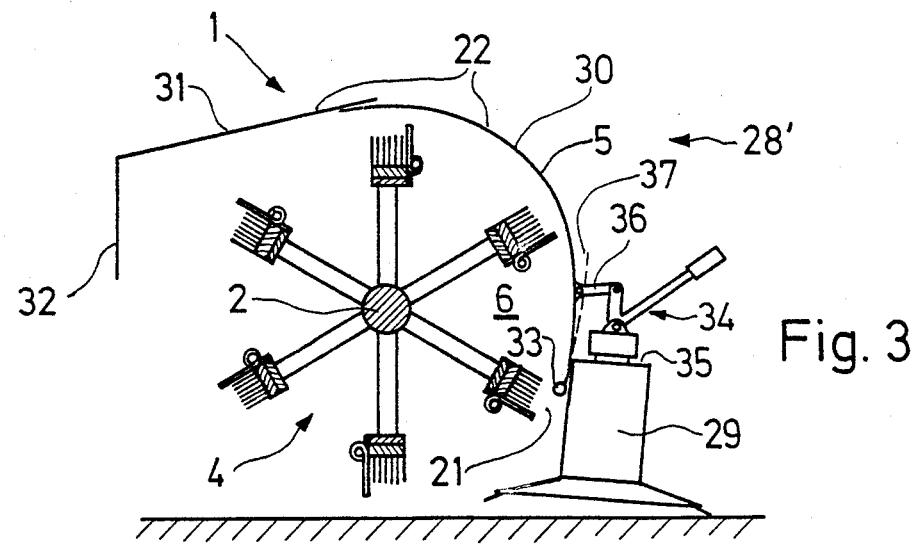
FIG. 3 is an elevation view of the invention corresponding to FIG. 2, but used in conjunction with a drum mower.

In FIG. 3 there is shown a mower-conditioning machine 28', which uses instead of the disc mower 27 a drum mower or circular mower 29. In contrast to the version shown in FIGS. 1 and 2, the the guide means 5 is not disposed within the hood 22 which covers the rotor 4, but forms itself a front region 30 of the hood 22, extending from the entry region 21 up to about half the diameter of the rotor 4. The region 31 of the hood 22 is provided on its rear end with a substantially vertical impact wall 32. This version is simpler and less costly than the version including the guide means 5 in the interior of the hood 2. As is the case in the other versions of the invention, also in the version of the invention illustrated in FIG. 3, the guide means 5 is pivotably mounted near the entry 21 of the guide channel 6, the pivoting means 33 being mounted on the (non-illustrated) frame of the mower-conditioning machine 28'.

The adjustment of the guide means 5 in a radial direction is accomplished in a manner similar to the versions illustrated in FIGS. 1 and 2 through a lever mechanism 34, which is pivoted on the frame 35 of the drum mower 29, and which is connected to an actuating lever 36 with the guide means 5. The direction of adjustment of the guide means 5 is indicated in FIG. 3 by a dotted line 37.

Figure 4:
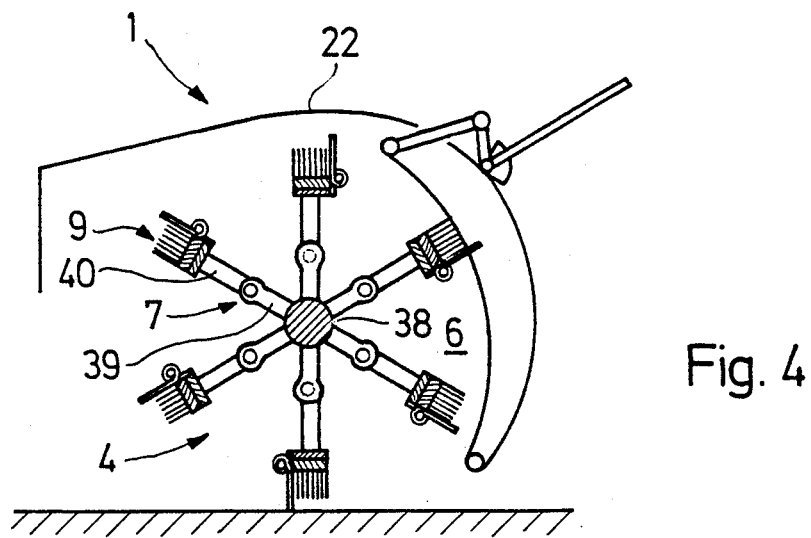
FIG. 4 is an elevation view, in part section, of another version of the present invention.

In contrast to the version of the invention shown in FIG. 1, in the implementation of the invention shown in FIG. 4, the arms 7 of the rotor 4 are two-piece arms, each arm 7 including a one-piece arm 39 secured to the axle 38 of the rotor 4, and pivotably connected thereto, and a carrier arm 40, on whose free and there are mounted the brushes 9.

Figure 6:
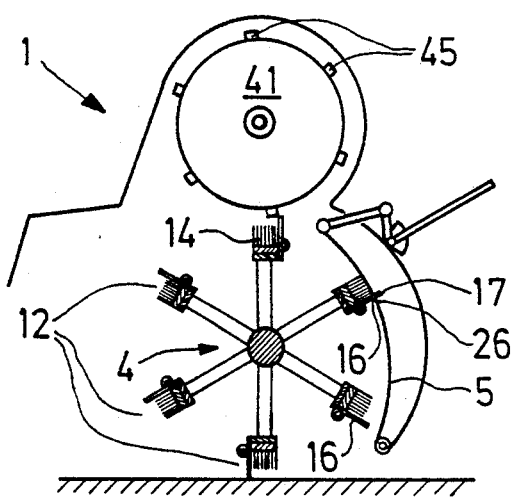
FIG. 6 is an elevation view in part section including a conditioning roller.

In a further version of the invention shown in FIG. 6, a device 1·includes a conditioning roll 41 operatively postcoupled to the rotor 4, and disposed above the rotor 4. The direction of rotation of the conditioning roll 4 may be the same as that of the rotor 4, or may be in a direction opposite thereto. Also the rotating velocity of the conditioning roll 41 may be greater or smaller than that of the rotor 4. Where stalked goods or fodder are passed through the guide channel 6 between the rotor 4 and the conditioning roll 41, the free ends 27 of the conveying prongs 16, which project radially beyond the bristles 14 of the brush arrangement 12 disposed on the periphery of the rotor 4, are freely able to pass through the slits 26 of the guide means 5.

Figure 7:
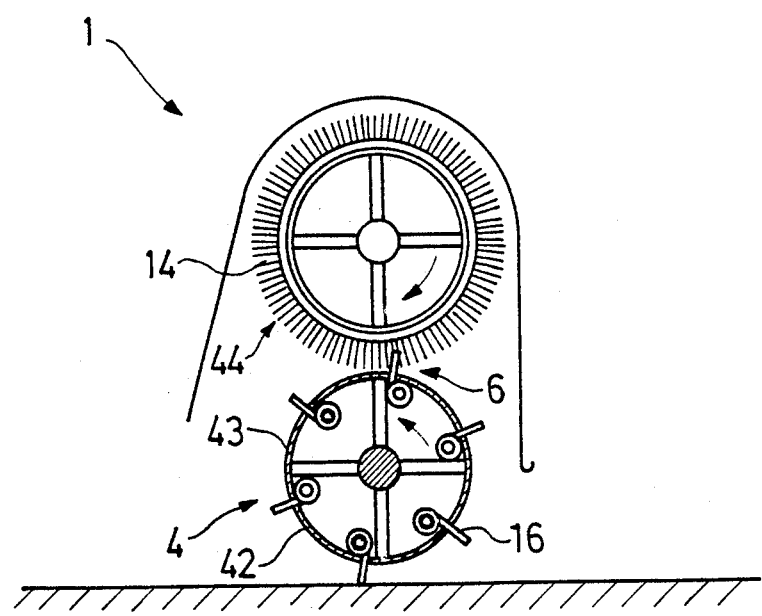
FIG. 7 is an elevation view, in part section, of an alternate version of the invention using a conditioning roller.

In still another version of the invention, shown in FIG. 7, for conditioning of stalked goods, contrary to the version of FIG. 6, the rotor 4 formed with a drum 42 is only provided with conveying prongs 16 serving a pick-up function, the conveying prongs 16 projecting radially outwardly from the smooth circumference 43 of the drum 42. The conditioning roll 41 is, however, provided with a brush arrangement 44, the conditioning roll 41 being preferably disposed above the drum 42, and the circular brush arrangement 44 disposed on the circumference of the conditioning roll 41 is adjustable in spacing with respect to the drum 42. The drum 44 thus functioning is equivalent to the action of the guide means 5, forming between the drum 43 and the conditioning roll 41 provided with a brush arrangement, a guide channel 6. The direction of rotation and/or velocity of the conditioning roll 41, and its brush arrangement may be in a direction equal to the direction of rotation of the drum 42, or in a direction opposite thereto, or it may rotate at a greater or smaller velocity than the velocity of the drum 42. During operation the machine 1, according to the present invention, the cut stalked goods are substantially accepted by the machine as the result of the action of the conveying prongs 16 being passed through the guide channel 6, where the goods are subjected to a precisely adjustable and complete conditioning as a result of the action of the bristles 14 of the brush arrangement 12.

I wish it to be understood that I do not desire to be limited to the exact details of construction shown and described, for obvious moidifications will occur to a person skilled in the art.

Having thus described the invention, what I claim as new and desire to be secured by Letters Patent, is as follows:

1. An agricultural machine movable over the ground for conditioning cut agricultural crop material, said machine comprising:
    (a) a rotor adapted for rotation about an axis parallel to the ground, said rotor having a periphery;
    (b) a plurality of brushes extending along the periphery of said rotor in a direction parallel to said axis, ech of said brushes having a leading edge and a trailing edge relative to the direction of rotation of said rotor, each of said brushes comprising a plurality of bristles, each of said bristles having a free end which extends radially outward from the periphery of said rotor;
    (c) a plurality of conveying prongs secured to the periphery of said rotor, each of said prongs having a free end which extends radially outward from the periphery of said rotor beyond the free ends of said bristles, at least one of said conveying prongs being located near the trailing end of each of said brushes, and
    (d) channel-forming means located adjacent said rotor for forming a guide channel for said cut crop material, said channel-forming means including a curved surface approximately defined by the trajectory of said free ends of said bristles when said rotor is rotating, said channel-forming means including at least one slit therein for receiving the free ends of said prongs so that said channel-forming means does not impair the rotary motion of said rotor,
said prongs being adapted to convey said crop material into said channel-forming means, said brushes being adapted to condition said crop material in said channel-forming means.

* * * * *